(12) United States Patent
Lakshminarayanan et al.

(10) Patent No.: US 8,082,218 B2
(45) Date of Patent: Dec. 20, 2011

(54) ANALYSIS OF SOFTWARE CONFLICTS

(75) Inventors: Karthik Lakshminarayanan, Issaquah, WA (US); Grigor Shirakyan, Kirkland, WA (US); R. C. Vikram Kakumani, Redmond, WA (US); Terrence Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/894,424

(22) Filed: Aug. 21, 2007

(65) Prior Publication Data

US 2009/0055340 A1     Feb. 26, 2009

(51) Int. Cl.
*G06F 17/00* (2006.01)
*G06N 5/02* (2006.01)

(52) U.S. Cl. .......................................................... 706/47
(58) Field of Classification Search ....................... 706/47
See application file for complete search history.

(56) References Cited

U.S. PATENT DOCUMENTS

| | | | |
|---|---|---|---|
| 6,446,218 B1 * | 9/2002 | D'Souza ........................... 714/4 |
| 6,477,531 B1 * | 11/2002 | Sullivan et al. ........................ 1/1 |
| 6,553,361 B1 | 4/2003 | Compton et al. |
| 6,856,984 B2 | 2/2005 | Slaikeu |
| 7,028,019 B2 | 4/2006 | McMillan et al. |
| 7,140,013 B2 | 11/2006 | Te'eni et al. |
| 2003/0014381 A1 * | 1/2003 | McMillan et al. ................. 707/1 |
| 2004/0123287 A1 | 6/2004 | Fox et al. |
| 2004/0153875 A1 | 8/2004 | Amyot et al. |
| 2005/0102666 A1 | 5/2005 | Barta et al. |
| 2005/0138208 A1 * | 6/2005 | Watt ............................... 709/246 |
| 2005/0268112 A1 * | 12/2005 | Wang et al. .................... 713/188 |
| 2006/0224544 A1 | 10/2006 | Keith, Jr. |

OTHER PUBLICATIONS

Cassavoy, Llane. "ITunes Forces Windows Users to Choose" PC World Nov. 7, 2003 p. 1-3. [ONLINE] Downloaded Jul. 26, 2010. http://www.pcworld.com/article/113336/itunes_forces_windows_users_to_choose.html.*
Mitchell, Robert, "Sidebar: Avoiding Application Conflicts", Date: Jul. 26, 2004, http://www.computerworld.com/softwaretopics/os/story/0,10801,94669,00.html.
Pakiarajah, et al. "Conflict Resolution Techniques for Expert Systems Used to Classify Remotely Sensed Satellite Images", http://www.geocomputation.org/2000/GC025/Gc025.htm.
Suwa, et al., "An Approach to Verifying Completeness and Consistency in a Rule-Based Expert System", Date: Jun. 1982, Stanford University, Stanford, CA. pp. 1-30.

* cited by examiner

*Primary Examiner* — Kakali Chaki
*Assistant Examiner* — Ben Rifkin

(57) ABSTRACT

Conflicts among programs are detected, and advice is given based on the detected conflicts. A set of conflict rules defines what constitutes a conflict, and a set of advice rules defines what advice is to be given in response to a conflict that has been detected. The conflict rules may be provided by a different party from the action rules, so the decision as to what constitutes a conflict can be made separately from the decision as to what advice should be given when a conflict is detected.

17 Claims, 4 Drawing Sheets

ANALYSIS OF SOFTWARE CONFLICTS

BACKGROUND

When two or more programs run on a computer, these programs can interact with each other in various ways. Certain types of interactions can be considered incompatibilities, or conflicts, in the sense that they degrade system performance or stability, lead to security vulnerabilities, etc.

In some situations, the presence of conflicts among programs can be brought to a user's attention. For example, an application may alert the user that a particular plug-in or add-on that has been installed in the application is causing stability issues. Software that performs these types of compatibility checks tends to focus on improving the reliability of the program that is performing the check, but may not check for the presence of other programs that are mutually incompatible with each other. Also, these types of compatibility checks are generally performed with a pre-defined and unchangeable notion of what constitutes a conflict, and of how a user should be advised of such a conflict.

SUMMARY

Conflicts among programs can be detected using conflict rules, and advice about what to do in response to the conflicts can be given using advice rules.

Conflict rules describe which programs conflict with each other. Additionally, the conflict rules may describe an area or "domain" in which the programs conflict, and may also include a "hedge" indicating the degree of the conflict. Examples of domains include areas such as "performance degradation," "crash," "security risk," etc. Examples of hedges that may be applied to a domain (such as "crash") include "certain," "likely," "possible," etc. Advice rules indicate what advice is to be given to a user, administrator, or other person when a conflict has been detected. The advice rules may call for different advice to be given based on the domain in which the conflict exists, the hedge associated with the conflict, or other factors.

The use of both conflict rules and advice rules allows the decision about what constitutes a conflict to be decoupled from the decision about what sort of advice is to be given when the conflict is detected. Thus, conflict rules can be created by one party, and advice rules can be created by another party. In some situations, what constitutes a conflict may be considered a technical issue, and how advice about conflicts should be presented to users may be viewed as a business issue, so each set of rules could be created by an entity with different expertise. However, conflict and advice rules can be created by any entity, and the same entity could create both sets of rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
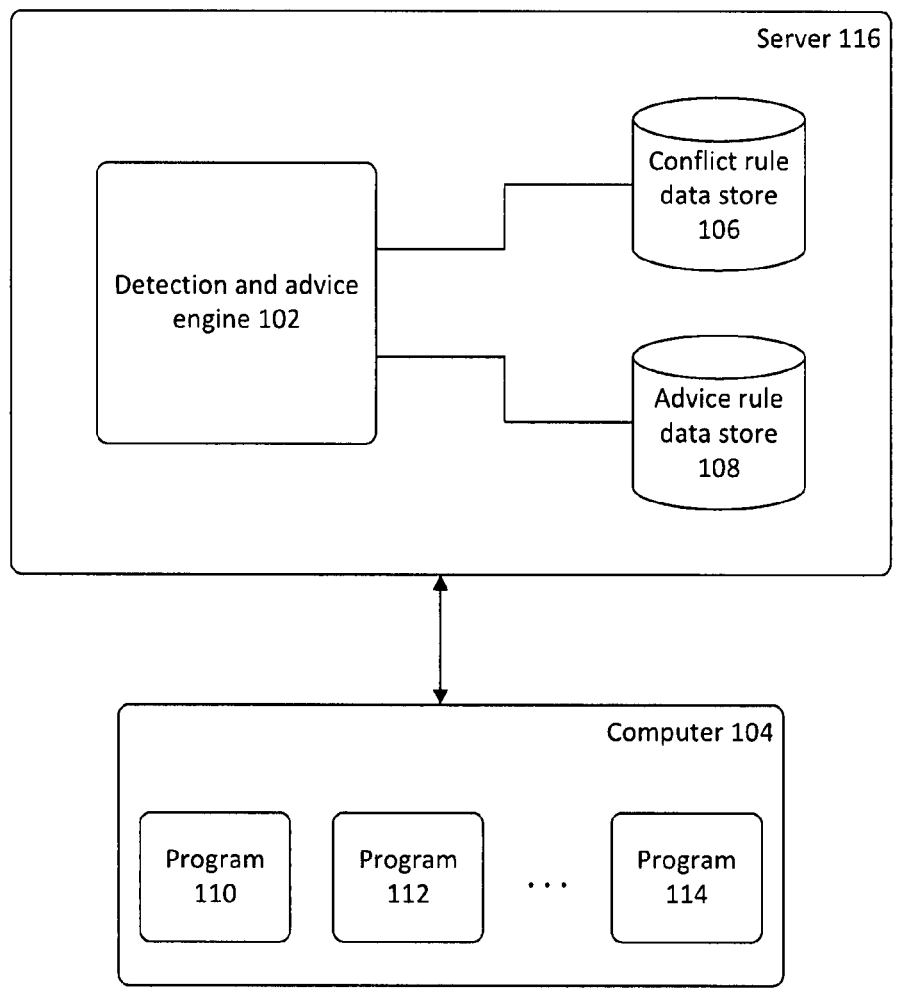
FIG. 1 is a block diagram of an example system that detects software conflicts and gives advice based on the detected conflicts.

Programs that co-exist on a computing device can conflict with each other in a variety of ways. For example, programs A and B may be individually stable, but when these two programs are installed or running on the same machine they may interact with each other in ways that cause performance degradation, loss of functionality, security risks, crashes, or other issues. A system can be configured to advise a user, administrator, or other person or entity, of conflicts between programs, and to provide advice on further action. An example of such advice is to recommend that one or both of the programs be disabled or uninstalled.

Conflicts among programs can come in different varieties. In many cases, two programs are neither perfectly compatible nor perfectly incompatible, but rather exhibit incompatibilities in different areas or in different degrees. For example, two programs can be incompatible in the sense that their co-existence could cause a crash (of one or both of the programs, or of the entire system on which they are running), a loss of performance (e.g., speed, throughput, etc.), a loss of functionality, a security risk, or some other type of problem. These different areas can be referred to as "domains." Moreover, the likelihood that the incompatibility will manifest, or the severity with which it will manifest, can vary based on circumstances. Thus, even if it can be said that two programs, A and B, are incompatible in the sense that their co-existence can cause a system crash, the conflict between these programs can be described as "certain," "likely," "possible," etc., depending on the likelihood that the crash will occur. (These different degrees are sometimes referred to as "hedges.")

Additionally, when a conflict among programs is detected, the nature of how a user (or administrator, or other person or entity) is advised of the conflict can be determined independently of the existence of the conflict itself. That is, for a given condition (e.g., "slight" loss of performance), different decisions could be made about what advice should be offered when that condition is found to exist. Thus, when two programs are conflicting in the sense that their co-existence is causing a slight loss of performance, the advice to be given could be, for example, to require that one or both programs be uninstalled, to recommend that one or both programs be uninstalled, or to recommend no action—depending on one's tolerance for a loss of performance. Different degrees of loss of performance can generate different kinds of advice (e.g., "severe" loss of performance could result in a recommendation to uninstall a program, but a "slight" loss of performance could generate a recommendation to take no action). Moreover, different types of conflicts can be treated differently (e.g., even a minor security risk could generate a strong urging to uninstall a program, but a significant loss of performance might generate merely a suggestion to uninstall a program). Additionally, the advice to be given can be tuned based on the preferences of a user, administrator, or other person. Thus, one may be able to set a sensitivity parameter indicating one's level of risk-adversity (e.g., "tolerant," "normal," "paranoid," etc.), and the advice to be given based on a given set of conflict conditions can be adjusted according to that parameter.

A set of rules can be created to define what constitutes a conflict, and another set of rules can be created to define what sort of advice is given when conflicts are detected. For example, a rule could say that two programs, A and B, conflict in the "crash" domain, and that the hedge that applies to the conflict is "possible." This rule may be understood to mean that if A and B are running or installed on the same machine, then it is possible that a crash will result. A different rule may state that if a conflict exists in the "crash" domain with a "possible" hedge, then the advice to be given is to recommend that one of the programs be uninstalled. The rules that define what constitutes a conflict can be separate from the rules that define what advice is to be given in a particular conflict situation. Thus, different parties can create these rules. In some business models, the decision of what constitutes a conflict is viewed as a technical judgment to be made by programmers, systems analysts, etc., while the decision as to what sort of advice should be given when a conflict exists is viewed as a business judgment to be made by someone with knowledge of the customers or users of a particular conflict-detection product or service. De-coupling the rules that define conflicts from the rules that define what advice is to be given allows the conflict rules and advice rules to be determined by people of different expertise (although these rules can be created by any person or entity, and the same entity could create both sets of rules).

Referring now to the drawings, FIG. 1 shows example components that may be used to detect software conflicts and to give advice based on what conflicts have been detected. Detection and advice engine 102 analyzes a computer system, such as computer 104, to determine the presence of software conflicts. Several programs, such as programs 110, 112, and 114, co-exist on computer 104 in the sense that these programs are running and/or installed on computer 104. Detection and advice engine 102 determines which (if any) of programs 110, 112, and 114 conflict with each other, and what advice to give if a conflict is detected.

Detection and advice engine 102 communicates with conflict rule data store 106 and advice rule data store 108. Conflict rule data store 106 stores rules that define conflicts among programs. Advice rule data store 108 stores rules that define advice to be given when certain incompatibilities exist. Examples of these rules are discussed below in connection with FIGS. 2-5.

Detection and advice engine 102 may determine whether there are conflicting programs on computer 104 by determining what programs are present on computer 104, and by consulting rules in conflict rule data store 106 to determine whether there are conflicts among these programs. The conflict rules may also indicate the nature and degree of these conflicts, by indicating a domain of the conflict and/or a hedge that applies to the conflict. The process of detecting what programs are present can be performed in any manner, such as by detecting running instances of programs on computer 104, checking what programs are installed as reflected in computer 104's registry, monitoring for attempts to install new software on computer 104, etc. Detection and advice engine 102 may attempt to create a list of all the programs that are present on computer 104 and may then compare that list to conflicts defined in conflict rule data store 106. Or, as another example, detection and advice engine 102 may consult conflict rule data store 106 to determine which programs are listed as being part of conflicting combinations and may then look for those combinations of programs on computer 104.

When a conflict has been detected, detection and advice engine 102 may determine what advice is to be given when a conflict is detected. Advice rule data store 108 contains rules describing what advice is to be given based on the domain in which the conflict exists, the hedge applied to the conflict, and possibly other factors. When a conflict has been detected, detection and advice engine 102 consults rules stored in advice rule data store 108 to determine what advice is to be given.

The detection of conflicts and provision of advice can be provided as an on-line service. For example, detection and advice engine and/or conflict rule data store 106 and/or advice rule data store 108 may exist on a server 116, and computer 104 may obtain an analysis of conflicts by providing certain information to server 116 through a network. However, the service of detecting conflicts and providing advice need not be part of an on-line service, and can be provided in any manner, such as through an application installed on computer 104.

Figure 2:
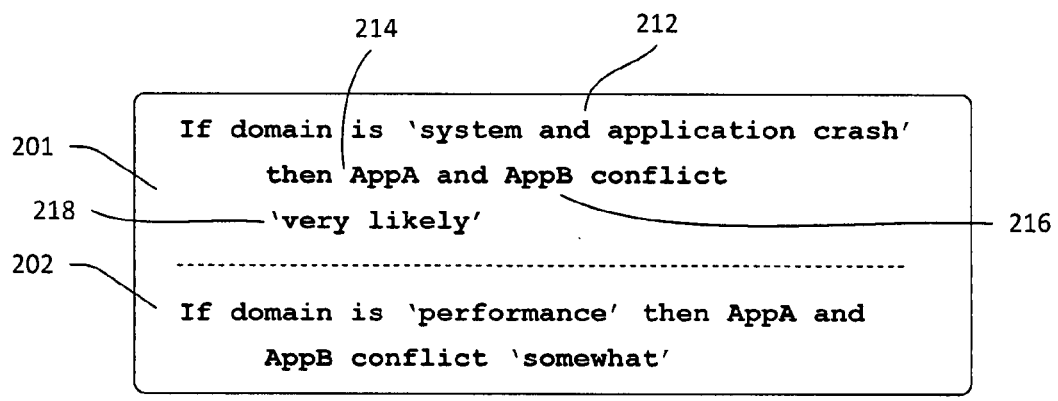
FIGS. 2 and 3 are diagrams of examples of conflict rules.
Figure 3:
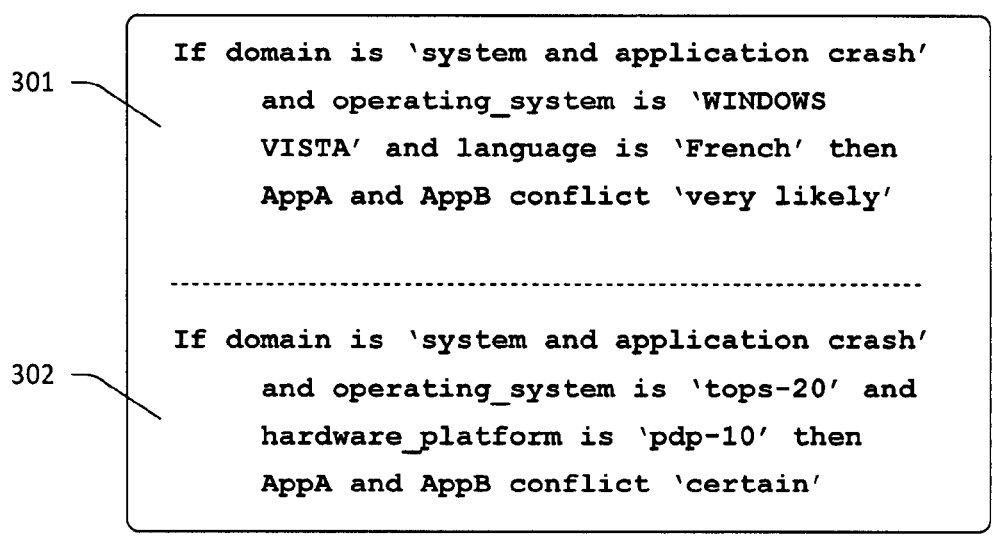

FIGS. 2 and 3 show examples of conflict rules, which could be stored in a conflict rule data store. In general, a conflict rule is a statement about whether two (or more) programs conflict with each other. In one example, a rule could take a form such as "AppA and AppB conflict," where "AppA" and "AppB" are two programs. However, in addition to simply stating that two programs conflict, it is possible to include other information about the nature of the conflict. For example, the rule can specify: a "domain" in which the programs conflict; a "hedge" value indicating the severity, likelihood, etc., of the conflict; information about the hardware or software environment to which the conflict rule applies; or other information. (Although the names of example programs "AppA" and "AppB" suggest that conflicts involve application programs, a conflict can be between any types of programs, whether or not the programs are applications. For example, a conflict could exist between an application program and an operating system.)

A domain is an aspect in which two programs can conflict. A domain may describe results that could be produced by conflicting programs. Examples of domains include: performance; functionality; system and application crash; security risk. Other types of domains could be defined. Thus, a rule can describe programs AppA and AppB as conflicting in the "system and application crash" domain, which would mean that the co-existence of these two programs could cause a system or application crash. It is possible to describe conflicts among programs without reference to a domain (as in the above-mentioned rule of "AppA and AppB conflict"). However, the notion of whether a conflict does, or does not, exist would likely be based on a judgment about what kinds of potential results (e.g., crashes, speed reductions, security risks, etc.) justify the conclusion that two programs conflict. The use of domains allows the conflict rules to provide information about what kinds of incompatibilities exist instead of making a blanket judgment that two programs either do, or do not, conflict. People who use or maintain computers (e.g., users, IT administrators, etc.) may care about certain types of incompatibilities more than others. For example, a user may care more about conflicts that cause crashes (e.g., conflicts in the "system and application crash" domain) than about conflicts that slow down the system (e.g., conflicts in the "performance" domain). Using domains as part of conflict rules leverages information about the nature of the incompatibility, and this information can be used to choose what advice is given when a conflict is detected.

Another type of information that can be part of a conflict rule is a hedge value indicating the severity of a conflict, the likelihood of a particular result, or some other information about the degree of the conflict. In fuzzy logic, a hedge value represents a degree to which an imprecise statement is true.

Thus, it may be the case that AppA and AppB conflict in the "system and application crash" domain, but the chance that an actual crash will occur when these two programs co-exist is somewhere between 0% and 100%. Thus, it is possible to use hedges such as "certain," "very likely," "possible," etc., to describe the degree of conflict between two programs in the "system and application crash" domain.

Table 1 shows some example domains, and some example hedges that can be used with these domains.

TABLE 1

| EXAMPLE DOMAIN | EXAMPLE HEDGES FOR DOMAIN |
| --- | --- |
| Performance | Severe |
| | Significant |
| | Somewhat |
| | Slight |
| | Unnoticeable |
| Functionality | Severe |
| | Significant |
| | Somewhat |
| | Slight |
| | Unnoticeable |
| System and application crash | Certain |
| | Very likely |
| | Possible |
| | Very unlikely |
| | Never observed |
| Security risk | High |
| | Moderate |
| | Low |

In addition to the example domains and hedges shown in Table 1, other domains and hedges can be defined.

Turning now to FIG. 2, there are shown conflict rules 201 and 202, which are examples of rules that could be stored in conflict rule data store 106 (shown in FIG. 1).

Rule 201 states: "If domain is 'system and application crash' then AppA and AppB conflict 'very likely'". Rule 201 describes a conflict between two programs, AppA and AppB (shown by numerals 214 and 216). Rule 201 describes these programs as conflicting in domain 212 ("system and application crash"), and hedge 218 describes this conflict as "very likely" (which could be understood to mean that a crash is very likely to occur when these two programs co-exist).

Rule 202 states: "If domain is 'performance' then AppA and AppB conflict 'somewhat'". Rule 202 describes a conflict between the two programs, AppA and AppB. The conflict is described as being in the "performance" domain, and the hedge further describes this conflict as "somewhat." This rule could be understood to mean, for example, that system performance will suffer "somewhat" if AppA and AppB are installed on the same machine and/or run at the same time.

In addition to the domains and hedges described above, conflict rules can incorporate other conditions. For example, some programs may conflict in a particular hardware and/or software environment, but not in others. Thus, a rule can describe the software or hardware environment to which the rule applies.

FIG. 3 shows conflict rules 301 and 302, which are further examples of conflict rules that can be stored in a conflict rule data store. Rule 301 states: "If domain is 'system and application crash' and operating system is 'WINDOWS VISTA' and language is 'French' then AppA and AppB conflict 'very likely'". This rule describes AppA and AppB as having a very likely conflict in the "system and application crash" domain, if the operating system is the French-language version of the WINDOWS VISTA operating system. Rule 302 is another rule, and it states: "If domain is 'system and application crash' and operating_system is 'tops-20' and hardware is 'pdp-10' then AppA and AppB conflict 'certain'". This rule describes AppA and AppB as having a certain conflict in the "system and application crash" domain if they are running under the TOPS-20 operating system on a PDP-10 computer.

Rules can incorporate any sort of condition. Operating system, language, and hardware are merely examples of conditions that can be made part of a conflict rule.

While conflict rules describe what constitutes a conflict, advice rules describe what type of advice is to be given when a conflict is found to exist. For example, if AppA and AppB are installed on the same machine, rule 201 (shown in FIG. 2) may be applied, resulting in a determination that a conflict in the "system and application crash" domain is "very likely." However, the fact that this conflict has been detected does not, in itself, say what advice should be given to a user, administrator, or other person or entity. An advice rule can be used to determine what advice should be given when a conflict has been found to exist. Advice rules may be stored in advice rule data store 108 (shown in FIG. 1). The advice rules may be used to provide "crisp" recommendations to the user by "defuzzifying" the hedged conflict information generated by the conflict rules.

Figure 4:
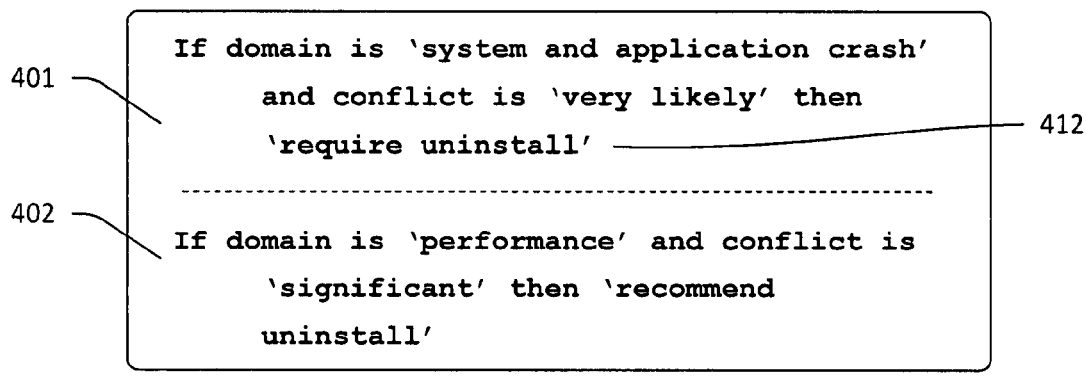
FIGS. 4 and 5 are diagrams of examples of advice rules.
Figure 5:
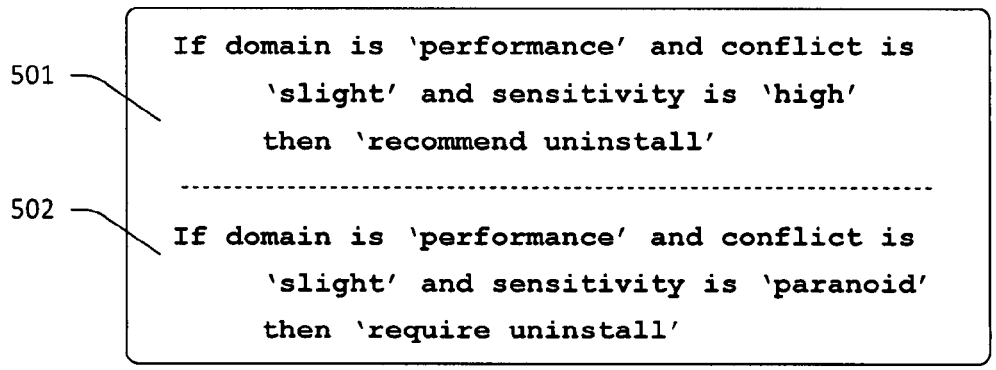

FIGS. 4 and 5 show examples of advice rules. In FIG. 4, rule 401 states: "If domain is 'system and application crash' and conflict is 'very likely' then 'require uninstall'". In this example, "require uninstall" (as shown by numeral 412) is an example of advice, and rule 401 defines the conditions under which such advice is to be given—in this case, when a conflict in the "system and application crash" domain exists and is subject to the "very likely" hedge. The presence of a conflict in the "system and application crash" domain (and the hedge that applies to the conflict) may be determined by the conflict rules previously discussed. For example, if AppA and AppB are installed on the same machine, then rule 201 (shown in FIG. 1) may be applied, resulting in a determination that a system or application crash is "very likely." It should be noted that the subject matter described herein can be used to decouple the decision about what conflicts exist from the decision as to what advice is to be given; conflict rules, such as those shown in FIGS. 2 and 3, are one way to determine what conflicts exist, but any mechanism can be used to make that determination. Assuming that some mechanism has been used to determine that a conflict in the "system and application crash" domain is "very likely," rule 401 can be applied to determine what advice. Based on rule 401, the advice to be given is that the user be required to uninstall a program (e.g., one or both of AppA and AppB). (When the advice is "require uninstall", typically this advice would be given in the form of a message telling the user that uninstallation of some program is "required." Even though the message states a "requirement," the message can be described as a form of "advice.")

Rule 402 is another advice rule, and it states: "If domain is 'performance' and conflict is 'significant' then 'recommend uninstall'". Thus, if a conflict has been determined to exist in the performance domain and the conflict is "significant", then the advice to be given is to "recommend" that one or more of the conflicting applications be uninstalled. "Requiring" and "recommending" can be described as different "levels of conviction" about the "uninstall" action. (In an example implementation, these levels of conviction (or other information, such as information about the severity of a conflict) could be communicated to a user graphically, such as with red, yellow, and/or green colors to indicate the level of conviction applied to a recommendation, the severity of a conflict, etc.)

It should be noted that advice rules 401 and 402 can be changed, which could result in different advice based on the same underlying conflict. For example, a person or entity that creates the advice rules may have a particular level of paranoia about conflicts (or tolerance of conflicts). Thus, if that person or entity is very paranoid, then rule 402 could be changed to give the advice "require uninstall" if a significant conflict exists in the performance domain. Or, if the person or entity is very tolerant of conflicts, then rule 402 could be changed to recommend "no action" if a significant conflict exists in the performance domain.

While the advice rules can be changed to accommodate a particular level of tolerance to conflicts, it is also possible to incorporate a variable level of tolerance into a given advice rule, as shown by rules 501 and 502 in FIG. 5.

A "sensitivity" parameter may be set to a value such as "low," "medium," "high," or "paranoid." The sensitivity parameter could be set by a user, an administrator, or some other person or entity. Rule 501 incorporates the sensitivity parameter, stating: "If domain is 'performance' and conflict is 'slight' and sensitivity is 'high' then 'recommend uninstall'". Rule 502 is similar, except that it addresses the case where sensitivity has been set to "paranoid" instead of "high," and the advice is to "require" (rather than to "recommend") an uninstall. Rules 501 and 502 demonstrate how advice rules can cause the same conflict to be addressed differently based on a setting.

It should be noted that the rules shown in FIGS. 2-5 are written in the form of text statements. However, the rules could be written or stored in any manner. For example, advice rules could be stored in the form of a matrix that correlates domains and hedges with specific forms of advice.

Figure 6:
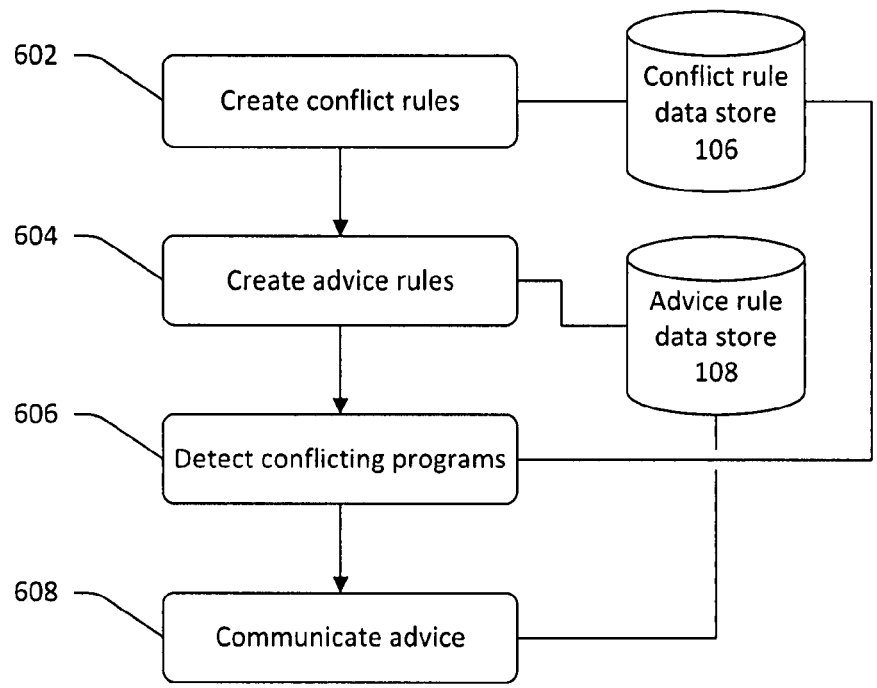
FIG. 6 is a flow diagram of an example process of creating and using rules.
Figure 7:
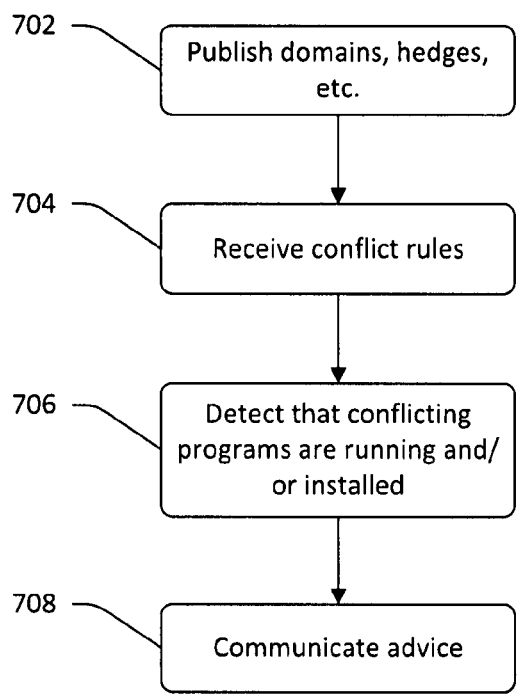
FIG. 7 is a flow diagram of an example process of using domains and conflict information.

FIGS. 6 and 7 are flow diagrams that show example processes. These processes are described, by way of example, with reference to components shown in FIG. 1, although these processes may be carried out in any system and are not limited to the scenario shown in FIG. 1. Additionally, each of the flow diagrams in FIGS. 6 and 7 shows an example in which stages of a process are carried out in a particular order, as indicated by the lines connecting the blocks, but the various stages shown in these diagrams can be performed in any order, or in any combination or sub-combination.

Referring now to FIG. 6, there is shown an example process in which rules and advice may be created and used.

At 602, conflict rules are created. The rules shown in FIGS. 2 and 3 are examples of conflict rules. The conflict rules may be stored in conflict rule data store 106.

At 604, advice rules are created. The rules shown in FIGS. 4 and 5 are examples of advice rules. These rules may be stored in advice rule data store 108.

The program conflict rules created at 602 may be created by a system analyst (e.g., by using analysis tools and metrics, by empirical judgment, etc.), and the advice rules created at 604 may be created by a business person, such as a product or service manager. However, these rules can be created by any person or entity.

At 606, conflicts among programs are detected. For example, engine 102 (shown in FIG. 1) may analyze the software installed and/or running on a computer to detect which software is running, and may compare the detected software with the conflict rules stored in conflict rule data store 106. The analysis yields information concerning detected conflicts, such as the domains in which a conflict exists, and the hedges that apply to those domains.

At 608, advice is communicated based on the analysis performed at 606. For example, the result of the analysis performed at 606 (e.g., the domains and hedges) may be compared with advice rules from advice rule data store 108, and advice may be generated based on the rules. The advice may then be communicated to a user, administrator, or other person or entity.

The subject matter described herein can be used to implement a consistent way to describe program conflicts. Domains describe various types of conflicts that can occur among programs, and hedges describe the likelihood or severity of those conflicts. While any domain or hedge can be defined, an entity that provides conflict detection services (e.g., the entity that operates server 116, shown in FIG. 1) may publish a specific set of domains and hedges so that various different parties can use the domains and hedges in a consistent way to create rules, thereby allowing rules that are obtained from various different sources to be used as part of the same end-to-end process. For example, a software manufacturer could provide conflict rules data about its own software, where the rules use the domains and hedges that have been published by the entity that provides conflict detection services.

FIG. 7 shows a process whereby a provider of conflict detection services publishes and uses domains and hedges. At 702, domains, hedges, and/or other information are published. For example, the operator of server 116 (shown in FIG. 1) may publish the domains and hedges that are recognized by detection and advice engine 102 (also shown in FIG. 1). At 704, conflict rules are received (e.g., from analysts who have determined what conflicts exist), where the rules use the published information to describe conflicts. Thus, if the domains and hedges shown above in Table 1 are published, then conflict rules that use these domains and hedges can be created by various parties (e.g., software manufacturers, systems analysts, etc.), and these conflict rules are received at 704. At 706, a computer or other machine is analyzed to detect, based on the received rules, whether conflicting programs are running. At 708, advice is given to a person regarding the conflicting programs, where the advice is generated based on detected conflicts and advice rules, as described above.

Figure 8:
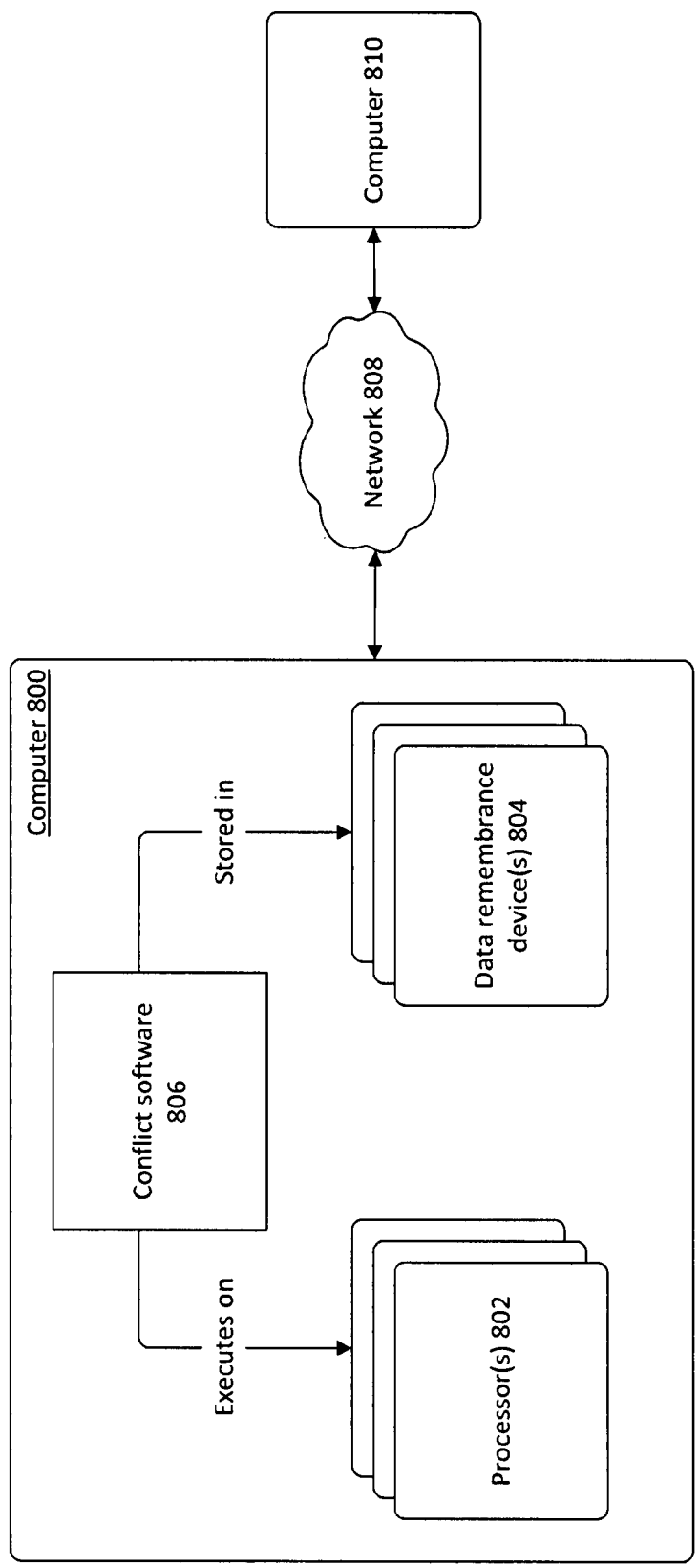
FIG. 8. is a block diagram of example components that may be used with implementations of the subject matter described herein

FIG. 8 shows an example environment in which aspects of the subject matter described herein may be deployed.

Computer 800 includes one or more processors 802 and one or more data remembrance devices 804. Processor(s) 802 are typically microprocessors, such as those found in a personal desktop or laptop computer, a server, or a handheld computer. Data remembrance device(s) 804 are devices that are capable of storing data for either the short or long term. Examples of data remembrance device(s) 804 include hard disks, removable disks (including optical and magnetic disks), volatile and non-volatile random-access memory (RAM), all types of read-only memory (ROM), flash memory, magnetic tape, etc. Data remembrance device(s) are examples of computer-readable storage media.

Software may be stored in the data remembrance device(s) 804, and may execute on the one or more processor(s) 802. An example of such software is conflict software 806, which may implement some or all of the functionality described above in connection with FIGS. 1-7. Software 806 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance device(s) 804 and that executes on one or more of the processor(s) 802. As another example, the subject matter can be implemented as software having instructions to perform one or more acts, where the instructions are stored on one or more computer-readable storage media.

In a typical environment, computer 800 may be communicatively connected to one or more other devices through network 808. Computer 810, which may be similar in structure to computer 800, is an example of a device that can be connected to computer 800, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media comprising executable instructions to perform a method, the method comprising:
    detecting a first program and a second program that co-exist on a computer;
    receiving, from a user, a sensitivity parameter that indicates said user's level of tolerance for conflicts;
    determining, based on a first rule, that a conflict exists between said first program and said second program, said first rule indicating a degree to which said conflict exists between said first program and said second program;
    determining, based on said conflict and on a second rule, advice to be given, said second rule indicating whether said advice is to recommend, or to require, removal of said first program or said second program based on said degree and based on said sensitivity parameter, such that said second rule calls for either a removal requirement or a removal recommendation to be given upon conflicts of the same degree depending on said sensitivity parameter; and
    communicating said advice to a person.

2. The one or more computer-readable storage media of claim 1, wherein said first rule indicates a domain in which said conflict exists, and wherein said second rule indicates, based at least in part on said domain, whether said advice applies to said conflict.

3. The one or more computer-readable storage media of claim 1, wherein said second rule indicates, based at least in part on said degree, whether said advice applies to said conflict.

4. The one or more computer-readable storage media of claim 1, said conflict being based on:
    performance degradation to be suffered when said first program and said second program co-exist on said computer;
    a likelihood that a crash is to occur when said first program and said second program co-exist on said computer; and
    a security risk that exists when said first program and said second program co-exist on said computer.

5. The one or more computer-readable storage media of claim 1, said first program being a version of an operating system in a specific human language, said conflict between said second program and said first program being particular to the human language version of the operating system.

6. A computer implemented method of advising on interactions among programs, the method comprising:
    publishing a plurality of domains that relate to program incompatibilities;
    receiving a first rule that defines an incompatibility between a first program and a second program in one of said domains and a degree to which said incompatibility exists, said first program being a version of an operating system in a specific human language, said incompatibility being particular to the human language version of the operating system;
    detecting that said first program and said second program are running on a first machine; and
    communicating, to a person, advice concerning said incompatibility, said advice being either to recommend removal of said second program or to require removal of said second program, whether to recommend or to require removal of said second program being based on a sensitivity parameter received from a user of said first machine, on said first rule, and on a second rule, said sensitivity parameter indicating said user's level of tolerance for conflicts, said second rule indicating whether removal of said second program is to be recommended or required based on said sensitivity parameter such that removal can be recommended or required for the same degree of incompatibility and different sensitivity parameters.

7. The method of claim 6, further comprising:
    for each of said domains, publishing a plurality of hedges, wherein said first rule specifies one of said hedges; and
    generating said advice based, at least in part, on said one of said hedges.

8. The method of claim 7, wherein said generating bases said advice at least in part on which of said domains said incompatibility relates to.

9. The method of claim 6, wherein a third rule comprises said advice and an indication of which of said domains said advice applies to, and wherein the method further comprises:
    generating said advice based on a comparison of said incompatibility with said third rule.

10. The method of claim 6, wherein the method is performed by a second machine, and wherein said detecting comprises:
    obtaining, from said first machine through a network, information indicating that said first program and said second program are co-existing on said first machine; and wherein said communicating comprises:
    sending said advice to said first machine through said network.

11. The method of claim 6, wherein said method further comprises:
    generating said advice based, at least in part, on a parameter that is settable by a user of said first machine.

12. The method of claim 6, wherein said method further comprises:
    generating said advice based, at least in part, on at least one of: (a) a type of hardware present at said first machine, (b) an operating environment present at said first machine, and (c) a version of said operating environment present at said first machine.

13. A system for addressing a conflict among programs, the system comprising:
    one or more data remembrance devices; and
    software that is stored in at least one of said one or more data remembrance devices, that accesses one or more conflict rules from a first store and one or more advice rules from a second store, that identifies, based on at least one of said one or more conflict rules, a conflict between a first program and a second program, that identifies, based on said conflict and at least one of said one or more advice rules, an item of advice, and that causes said item of advice to be communicated to a person or to be displayed, a first one of said conflict rules rule indicating a degree to which said conflict exists between said first program and said second program, a first one of said advice rules indicating whether removal of a program is to be recommended or required based on a sensitivity parameter such that removal can be recommended or required for the same degree of conflict and different sensitivity parameters, said sensitivity parameter being received from a user of a computer of which said one or more data remembrance devices are a part, said sensitivity parameter indicating said user's level of tolerance for conflicts, said first program being a version of an operating system in a specific human language, said conflict between said first program and said second program being particular to the human language version of the operating system.

14. The system of claim 13, wherein said one or more conflict rules comprise an indication of a domain in which said first program and said second program conflict, and wherein said one or more advice rules are based, at least in part, on said domain.

15. The system of claim 14, wherein said domain is one of: performance, functionality, potential of crash, and security risk.

16. The system of claim 13, wherein said item of advice comprises an indication of a level of conviction, and wherein said level of conviction is chosen from a set that comprises three or more levels of conviction, one of said levels of conviction being to recommend action, another of said levels of conviction being to require action.

17. The system of claim 13, said conflict being based on:
performance degradation to be suffered when said first program and said second program co-exist on said computer;
a loss of a function that is to occur when said first program and said second program co-exist on said computer;
a likelihood that a crash is to occur when said first program and said second program co-exist on said computer; and
a security risk that exists when said first program and said second program co-exist on said computer.

* * * * *